United States Patent
Sahu et al.

(10) Patent No.: US 11,683,066 B2
(45) Date of Patent: Jun. 20, 2023

(54) TRANSCEIVER WITH AUXILIARY RECEIVER CALIBRATION APPARATUS AND METHODOLOGY

(71) Applicant: Texas Instruments Incorporated, Dallas, TX (US)

(72) Inventors: Debapriya Sahu, Bangalore (IN); Rohit Chatterjee, Bangalore (IN); Srinivas Venkata Veeramreddi, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/348,817

(22) Filed: Jun. 16, 2021

(65) Prior Publication Data

US 2021/0314018 A1  Oct. 7, 2021

Related U.S. Application Data

(63) Continuation of application No. 16/404,598, filed on May 6, 2019, now Pat. No. 11,070,242.

(51) Int. Cl.
*H04B 1/44* (2006.01)
*H04L 27/36* (2006.01)

(52) U.S. Cl.
CPC ............. *H04B 1/44* (2013.01); *H04L 27/367* (2013.01)

(58) Field of Classification Search
CPC .......... H04B 17/13; H04B 1/44; H04L 27/367
See application file for complete search history.

(56) References Cited

U.S. PATENT DOCUMENTS

| | | | |
|---|---|---|---|
| 8,406,358 B1 * | 3/2013 | Uehara | H04B 1/0028 455/296 |
| 9,136,899 B2 * | 9/2015 | Chakraborty | H04B 1/40 |
| 11,070,242 B2 * | 7/2021 | Sahu | H04B 1/04 |
| 2003/0165203 A1 | 9/2003 | Mohindra | |
| 2013/0217343 A1 | 8/2013 | Tenbroek | |

* cited by examiner

*Primary Examiner* — David S Huang
(74) *Attorney, Agent, or Firm* — Mandy Barsilai Fernandez; Frank D. Cimino

(57) ABSTRACT

A wireless transceiver. The transceiver includes: (i) a transmit signal path; (ii) a calibration path, comprising a conductor to connect a calibration tone into the transmit signal path; (iii) a receive signal path, comprising a first data signal path to process a first data and a second data signal path, different than the first data signal path, to process a second data; (iv) a first capacitive coupling to couple a response to the calibration tone from the transmit signal path to the first data signal path; and (v) a second capacitive coupling to couple a response to the calibration tone from the transmit signal path to the second data signal path.

20 Claims, 3 Drawing Sheets

TRANSCEIVER WITH AUXILIARY RECEIVER CALIBRATION APPARATUS AND METHODOLOGY

CROSS REFERENCE TO RELATED APPLICATIONS

This application is a continuation of U.S. patent application Ser. No. 16/404,598, filed on May 6, 2019, the entirety of which is incorporated by reference herein.

BACKGROUND

This document relates to calibrated wireless communication devices.

Wireless communication devices, sometimes referred to as transceivers, use various forms of modulation, including quadrature amplitude modulation ("QAM"). QAM communications allow multiple data bits to be concurrently communicated, with the data values represented—modulated at the transmitter, demodulated at the receiver—by changes in amplitude and phase of the modulation wave. Typically, a baseband stream of data bits is separated, sometimes bit by bit, into two paths or channels, one considered the in-phase component and designated as the "I" portion of the transmitted signal and the other considered the quadrature-component and designated as the "Q" portion of the transmitted signal. Each component is separately modulated and then mixed (e.g., added) together, thereby presenting a combined signal that equivalently presents both amplitude and phase modulation in a single carrier.

Prior art transceivers can include one or more power amplifiers, such as a pre-amplifier stage followed by a power amplifier stage. The larger power stage may be operated in a non-linear region, where the output signal does not necessarily represent a fixed linear multiple of the input signal and the gain reduces as the power of the input signal increases (toward saturation). Such non-linear usage is sometimes accepted because it permits lower power consumption by the power amplifier, but at the same time it introduces non-linear gain and leads to distortion of the signal. And, such distortion, if left untreated, would produce an output signal in violation of standards. To mitigate this distortion, the usual practice is to use part of the receive path in the transceiver to sample the outgoing transmitted signal, and provide an appropriate signal-level dependent gain to the transmit path, to adjust for, or cancel, the effect of the non-linear power amplifier. Those parts of the receiver path which are used for this functionality, along with any modules used to couple the signal from the transmit path to the receive path, are together referred to as the auxiliary receiver path. This signal dependent gain is used to counteract or "pre-distort" the transceiver input signal, knowing that the input signal will be affected (offset) by the distorting non-linearity of the power amplifier. Moreover, because the input data is sometimes by way of digital-to-analog (DAC) conversion, the signal dependent gain can be implemented by means of a look up table (LUT) which maps the input value to a different value, so the correction is sometimes referred to as digital pre-distortion ("DPD").

While the preceding approach is effective in some implementations, use of the transceiver receiver path as part of the DPD correction may introduce errors of its own, to the extent that the receiver path is itself non-ideal. Thus, the present inventors seek to improve upon the prior art, as further detailed below.

SUMMARY

In one example embodiment, there is a wireless transceiver. The transceiver comprises: (i) a transmit signal path; (ii) a calibration path, comprising a conductor to connect a calibration tone into the transmit signal path; (iii) a receive signal path, comprising a first data signal path to process a first data and a second data signal path, different than the first data signal path, to process a second data; (iv) a first capacitive coupling to couple a response to the calibration tone from the transmit signal path to the first data signal path; and (v) a second capacitive coupling to couple a response to the calibration tone from the transmit signal path to the second data signal path.

Numerous other examples and inventive aspects are also disclosed and claimed.

DETAILED DESCRIPTION

Figure 1A:
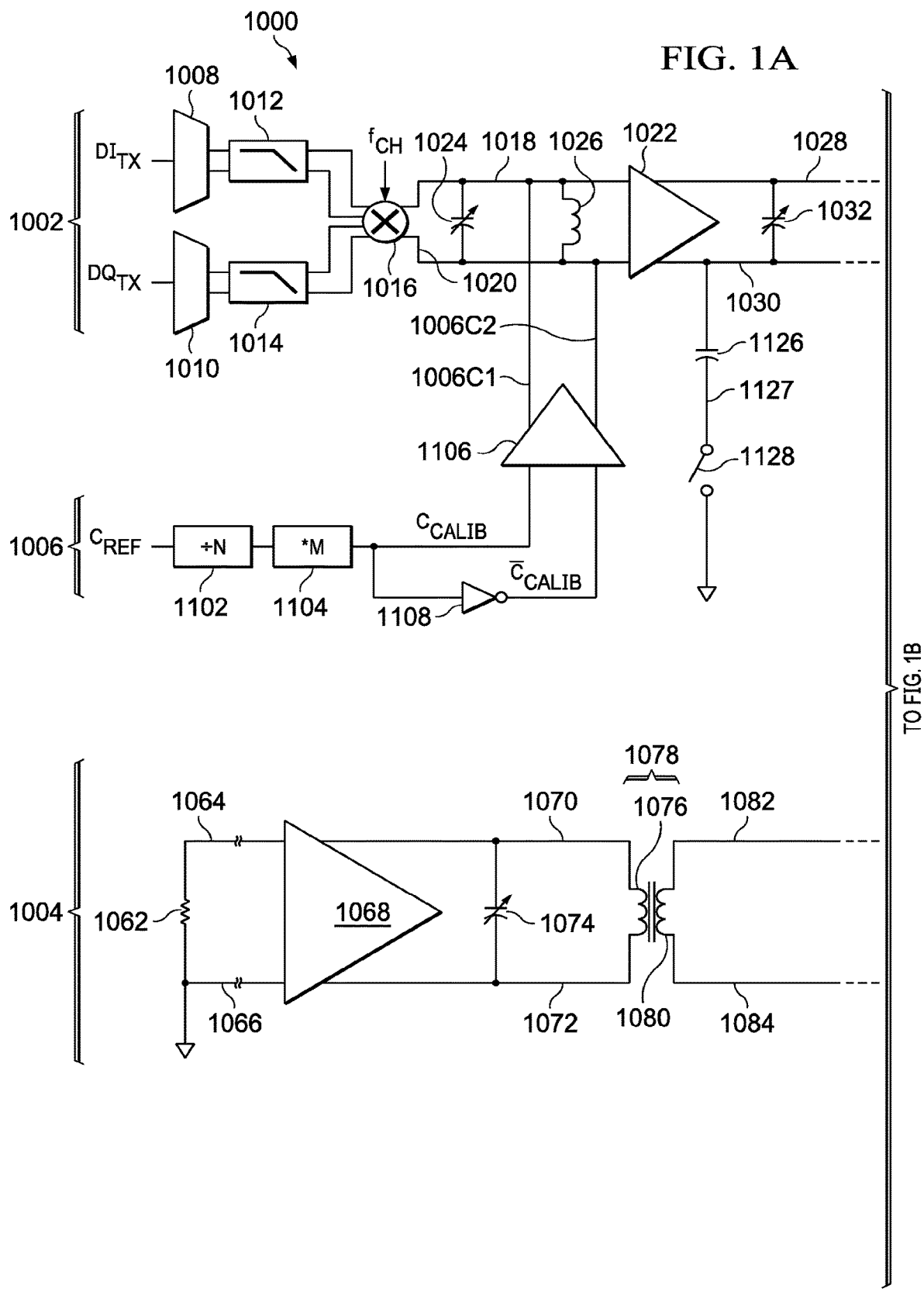
FIGS. 1A and 1B are a combined electrical block and schematic diagram of an example embodiment transceiver.
Figure 1B:
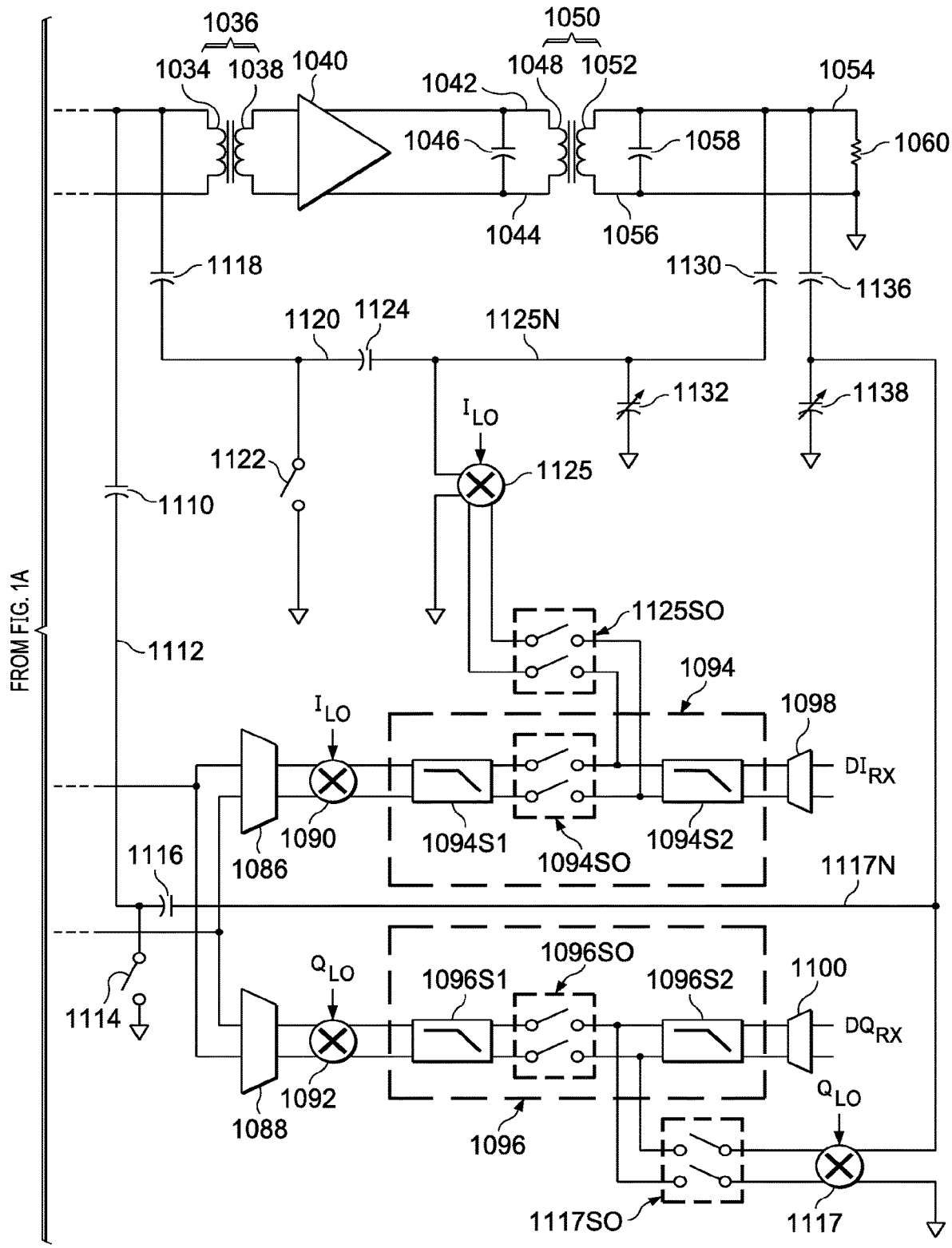

FIGS. 1A and 1B are a combined electrical block and schematic diagram of an example embodiment transceiver 1000. For discussion sake, transceiver 1000 is shown to include a transmit path 1002 and a receive path 1004, where each path includes various connectivity and circuitry to process data by propagating signals along each path and its connectivity and circuitry for the respective function of either transmitting or receiving data. The transceiver 1000 also includes a calibration path 1006 which, as detailed throughout this document, injects a calibration signal(s) into a portion of transmit path 1002, from which a response is capacitively coupled into the receive path 1004, to improve transceiver calibration. Accordingly, a relatively small amount of hardware is added and a calibration signal (e.g., potentially amplifiable) is created, and travels a path that avails of existing portions of the transmit path 1002. Further, that path continues through capacitive coupling to a portion of the receive path 1004, such that the calibration signal is sufficiently strong when needed for calibration purposes, yet isolation is maintained between the transmit path 1002 and the receive path 1004 during non-calibration operation. Each of these aspects is further explored below.

The transmit path 1002 includes two data digital streams, $DI_{TX}$ and $DQ_{TX}$, corresponding to in-phase and quadrature-phase, I and Q data, respectively. Such data may be provided by additional blocks, not shown, in transceiver 1000. For example, such data may be selected from a binary data stream, by choosing every odd positioned bit as the I data and even positioned bit for the Q data (or vice versa). The selected bits may be baseband data or may have been affected by other circuitry, such as through spreading and/or interleaving. In any event, a number of such bits are provided as data $DI_{TX}$ to an input of a digital to analog converter (DAC) 1008 at a given time, and likewise a same number of bits are provided as data $DQ_{TX}$ to an input of a DAC 1010. Such data is provided at a baseband frequency $f_{BB}$. The analog differential outputs of each of the DAC 1008 and the DAC 1010 are connected as inputs to respective low pass filter (LPF) 1012 and 1014. The differential outputs of each of the LPF filter 1012 and the LPF filter 1014 are connected to a mixer 1016, which is clocked by a channel frequency $f_{CH}$. The channel frequency $f_{CH}$ may be one to two orders of magnitude faster than the baseband frequency $f_{BB}$. For example, consider a baseband frequency $f_{BB}$ of 40 MHz and a channel frequency $f_{CH}$ of 2.45 GHz. Hence, mixer 1016 samples and mixes the data at the channel frequency $f_{CH}$ rate, providing a combined modulated signal for transmission along the rest of the transmit path 1002. A receiving device (not shown) may then determine the original transmitted data by demodulating and reversing the process, as may be achieved by a receive path in another transceiver.

Continuing in FIGS. 1A and 1B, and with the output of the mixer 1016 in the transmit path 1002, the output of the mixer 1016 is connected across two nodes 1018 and 1020, which provide differential inputs to a pre-amplification power amplifier (PPA) 1022. The PPA 1022 provides a first level of amplification to the transmit stage 1002 signal. A variable capacitor 1024 and an inductor 1026 are also connected in parallel, providing an LC tank, between the nodes 1018 and 1020. The PPA 1022 has differential outputs connected to respective nodes 1028 and 1030. A variable capacitor 1032 and a primary inductor 1034 of a transformer 1036 are also connected in parallel, providing an LC tank, between the nodes 1028 and 1030. A secondary inductor 1038 of the transformer 1036 is connected to differential inputs of a power amplifier (PA) 1040, which provides a second level of amplification to the transmit stage 1002 signal. The PA 1040 has differential outputs connected to respective nodes 1042 and 1044. A fixed capacitor 1046 and a primary inductor 1048 of a transformer 1050 are also connected in parallel between nodes 1042 and 1044. A secondary inductor 1052 of transformer 1050 is connected between nodes 1054 and 1056. A capacitor 1058 is connected between nodes 1054 and 1056, as is an antenna, shown as a resistive load 1060. The node 1056 is also connected to ground.

Turning to the receive path 1004 in greater detail, it includes a receive antenna, shown as a resistive load 1062, connected between two nodes 1064 and 1066, and the node 1066 is also connected to ground. The nodes 1064 and 1066 may be directly connected, or as shown by broken lines in FIG. 1A may be coupled through other devices (not shown), to differential inputs of a low noise amplifier (LNA) 1068. The LNA 1068 has differential outputs connected to respective nodes 1070 and 1072. A variable capacitor 1074, and a primary inductor 1076 of a transformer 1078, are also connected in parallel between the nodes 1070 and 1072. A secondary inductor 1080 of transformer 1078 is connected between nodes 1082 and 1084. The node 1082 is connected to a first input of a first trans-impedance amplifier (TA) 1086 and to a first input of a second TA 1088, and the node 1084 is connected to a second input of the first TA 1086 and to a second input of the second TA 1088, where the first and second TAs 1086 and 1088 provide isolation for splitting the receive path into I and Q data. The outputs of the first TA 1086 are connected as inputs to an I data mixer 1090 that samples in response to a local oscillator signal $I_{LO}$, and the outputs of the second TA 1088 are connected as inputs to a Q data mixer 1092 that samples in response to a local oscillator signal $Q_{LO}$, where $I_{LO}$ and $Q_{LO}$ are preferably at the same frequency and $Q_{LO}$ is the 90 degree phase shifted version of $I_{LO}$. The differential output of the I data mixer 1090 is an input to a two-stage low pass filter 1094, and the differential output of the Q data mixer 1092 is connected as an input to a two-stage low pass filter 1096.

The two-stage low pass filter 1094 has a first stage 1094S1 and a second stage 1094S2, with a differential switched output 1094SO between the stages 1094S1 and 1094S2. Similarly, the two-stage low pass filter 1096 has a first stage 1096S1 and a second stage 1096S2, with a differential switched output 1096SO between the stages 1096S1 and 1096S2. The differential output of the low pass filter 1094 is connected as an input to an analog-to-digital converter ("ADC") 1098, and the output of the low pass filter 1096 is connected as an input to an ADC 1100. The ADC 1098 converts its analog input to a digital value $DI_{RX}$, and the ADC 1100 converts its analog input to a digital value $DQ_{RX}$.

Turning to the calibration path 1006 in greater detail, it includes a first portion that, in an example embodiment, directly and favorably injects signals of a desirable signal strength into the transmit path 1002. This first portion includes a reference clock $C_{ref}$, which may cycle at a 50% duty cycle, and that is connected to an input of a divide block 1102. For sake of later reference, the divide block 1102 is shown to divide the reference clock $C_{ref}$ by an integer N. The output of the divide block 1102 is connected to an input of a multiplier block 1104 (e.g., a delay locked loop (DLL) multiplier), where for sake of later reference the multiply block 1104 is shown to multiply the input ($C_{ref}$/N) by an integer M. The output of the multiply block 1104, therefore, provides the reference clock $C_{ref}$ as multiplied times a ratio of M/N, and that output is hereafter referred to as a calibration clock $C_{calib}$. The calibration clock $C_{calib}$ is connected as a first input to a differential amplifier 1106, and it also is connected through an inverter 1108 to provide an inverted version of the calibration clock, shown as $\overline{C_{calib}}$, to a second input of the amplifier 1106. A first output of the differential amplifier 1106 is connected through a conductor 1106C1 to the node 1018, and a second output of the differential amplifier 1106 is connected through a conductor 1106C2 to the node 1020.

Also as part of the calibration path 1006, it includes a second portion from the output of the PPA 1022, at the node 1028, for capacitively coupling signals injected into and passing through a portion of the transmit path 1002 into the auxiliary receive path. Such signals may be used for calibrating transceiver 1000, as further detailed later, and the capacitive coupling provides favorable connectivity of calibration signal strength during an auxiliary calibration mode, and facilitates isolation during a regular data transmit mode during which data is transmitted from the transceiver 1000 to a remote receiver device (e.g., another device implementing the configuration of the transceiver 1000). In this second calibration path portion, the node 1028 is connected through a capacitor 1110 to a node 1112. The node 1112 is connected to a first terminal of a first switch 1114, and the second terminal of the first switch 1114 is connected to ground. The node 1112 is also connected through a capacitor 1116 to a node 1117N, which is connected to an input of a Q data auxiliary receiver mixer 1117, which has a second input connected to ground and which also samples in response to the local oscillator signal $Q_{LO}$. The differential output of the Q data auxiliary receiver mixer 1117 is connected through respective switches 1117SO to the differential input of the second stage 1096S2 of the filter 1096. Also in the second portion of the calibration path 1006, the node 1028 is connected through a capacitor 1118 to a node 1120. While the PPA 1022 is a differential amplifier, for calibration mode purposes the example embodiment uses only one of the PPA 1022 outputs (at node 1028) to generate a calibration tone, therefore using the PPA 1022 in single-ended mode. The node 1120 is connected to a first terminal of a second switch 1122, and the second terminal of the second switch 1122 is connected to ground. The node 1120 is also connected through a capacitor 1124 to a node 1125N, which is connected to an input of an I data auxiliary receiver mixer 1125, which has another input connected to ground and which also samples in response to the local oscillator signal $I_{LO}$. The differential output of the I data auxiliary receiver mixer 1125 is connected through respective switches 1125SO to the differential input of the second stage 1094S2 of the filter 1094. The second portion of the calibration path 1006 also includes a capacitor 1126 connected between the node 1030 and a node 1127 connected to a first terminal of a third switch 1128. The second terminal of the third switch 1128 is connected to ground. Given the preceding, "capacitive coupling" herein refers to a signal path that includes one or more capacitors for communicating a signal from a node in the transmit path 1002 to a node in the receive path 1004, where it should be understood that the signal path may include more than merely one or more capacitors (or other devices). Lastly, each of capacitors 1110, 1116, 1118, and 1124 preferably has a same value, such as 60 fF, and capacitor 1126 has a value of 120 fF. In this manner, the strength of the calibrating tone that is coupled into the AuxRx mixer depends on the relative values of capacitors 1110 and 1116 (and 1138), or similarly on capacitors 1118 and 1124 (and 1132). Moreover, capacitor 1126 is set at 120 fF, so that the total capacitance on either side of the PPA 1022 outputs are the same (capacitors 1110 and 1118 are connected to the other output, accounting for a total capacitance of 120 fF).

Completing the description of the calibration path 1006, it also includes a third portion, from the secondary inductor 1052 of the transformer 1050, at the node 1054. The third portion may capacitively couple additional signals from the transmit path 1002 into the auxiliary receive path, for example for use in a separate part of calibration (e.g., digital pre-distortion (DPD)). Specifically, the node 1054 is connected through a capacitor 1130 to the node 1125N, which recall is connected as an input to the I data auxiliary receiver mixer 1125. The node 1125N is also connected through a variable capacitor 1132 to ground. Similarly, the node 1054 is connected through a capacitor 1136 to the node 1117N, which recall is connected as an input to the Q data auxiliary receiver mixer 1117. The node 1117N is also connected through a variable capacitor 1138 to ground.

The operation of the transceiver 1000 is now described, in connection with signal transmission. In general, the transceiver 1000 may operate in two different modes: (i) a calibration mode for calibrating the transmit path 1002 based, in part, on responsive signals from a portion of the receive path 1004; and (ii) transmit (and/or receive) mode, during which the calibration path 1006 is disabled (or disconnected from the transmit and receive paths 1002 and 1004), but under which transmit operations are improved given the calibration achieved during the calibration mode. Each of these modes is further discussed below. Further, the receiving operation of the transceiver 1000 is not detailed herein, as it should be appreciated by one skilled in the art.

The calibration mode operation of the transceiver 1000 is now described. By way of introduction, calibration of the transceiver 1000 generally is performed so as to offset any non-idealities in any of the devices, connections, and operation of the transceiver 1000. For example, during the transmit mode, the PA 1040 is preferably operated in a non-linear region, to improve the PA power efficiency by lowering overall power consumption. However, in non-linear operation, then by definition as the input values increase, gain of the PA 1040 reduces, so it is desirable to create an offset against such gain reduction, for example by adding an additional value to the input at an input power level corresponding to that additional value. The amount of desirable offset is preferably determined during the calibration mode, at least in part, by coupling a portion(s) of the transmit path 1002 to at least a portion of the receive path 1004, and evaluating the output values $DI_{Rx}$ and $DQ_Rx$ relative to the input values $DI_{TX}$ and $DQ_{TX}$, respectively. The portion of the receive path 1004 is therefore used during this time in an auxiliary manner, that is, to supplement calibration, as opposed to the more common function of the receive path 1004 to receive signals from another external transmitting device. In this auxiliary function, non-idealities in the receive path also will be introduced into the calibration determination. Accordingly, an example embodiment of the transceiver 1000 further accounts for such receive path non-idealities as part of the calibration mode, in what will be referred to as an auxiliary calibration mode, as further described below.

Figure 2:
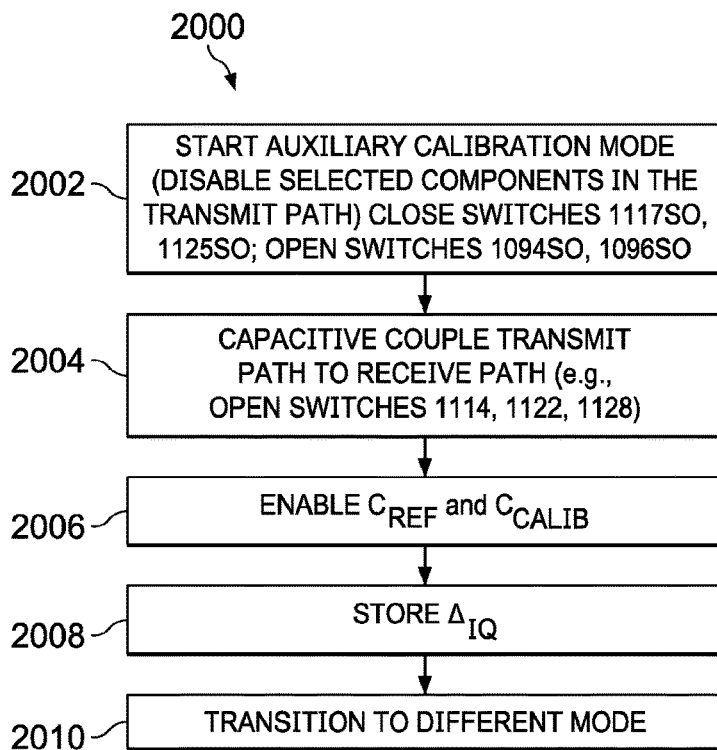
FIG. 2 illustrates a flow chart method for describing certain operations of the FIG. 1A/1B transceiver in the auxiliary calibration mode.

FIG. 2 illustrates a flow chart method 2000, describing certain operations of the transceiver 1000 in the auxiliary calibration mode. The steps of the flow chart 2000 are shown sequentially for sake of explanation, but one skilled in the art will understand that certain steps/operations may overlap, differ in order, or otherwise be accomplished within the inventive scope. Further, the method 2000 steps (and others described herein) may be implemented and sequenced by various controlling hardware, software (including firmware), or a combination thereof. The method 2000 commences with a start auxiliary calibration mode step 2002. During the step 2002, various components in the transmit path 1002 may be disabled. In an example embodiment, such components include the DACs 1008 and 1010, the low pass filters 1012 and 1014, the mixer 1016, and the PA 1040. Additionally, the receive path till (and including) the first stage filters 1094S1 and 1096S1, are disabled, and switches 1117SO and 1125SO are closed, and the switches 1094SO and 1096SO are opened. With such devices so configured, the method 2000 continues from step 2002 to a step 2004.

The step 2004 capacitively couples a portion of the transmit path 1002 to a portion of the receive path 1004. In an example embodiment, the step 2004 is achieved by opening switches 1114, 1122, and 1128, thereby disconnecting nodes 1112, 1120, and 1127, respectively, from ground. The signal at the node 1028 is thereby connected through capacitor 1110 and capacitor 1116 as an input to the Q data auxiliary receiver mixer 1117, and the same signal at the node 1028 is thereby connected through capacitor 1118 and capacitor 1124 as an input to the I data auxiliary receiver mixer 1125. Further, with the switches 1117SO and 1125SO closed, the differential output of the Q data auxiliary receiver mixer 1117 is connected to the differential input of second stage 1096S2, and the differential output of the I data auxiliary receiver mixer 1125 is connected to the differential input of second stage 1094S2. Next, the method 2000 continues from the step 2004 to a step 2006.

The step 2006 enables the reference clock $C_{ref}$, or otherwise gates it through to the calibration path 1006. Given the earlier-described connectivity, $C_{ref}$ thus provides a 50% duty cycle signal that, times M/N, results in the calibration clock $C_{calib}$ and its complement, $\overline{C_{calib}}$. In an example embodiment, the frequency of the reference clock $C_{ref}$, and the values of M and N, are selected so that $C_{calib}$ (and its complement, $\overline{C_{calib}}$) provide a target odd harmonic signal close to the channel frequency $f_{CH}$, where recall that channel frequency is the sampling frequency of the transmit mixer 1016 and by way of example $f_{CH}$=2.45 GHz. For example, $C_{calib}$ provides a base frequency chosen with harmonics that are some frequency spacing apart (e.g., 30 MHz), and so that some odd harmonic of the base frequency $C_{calib}$ (e.g., $(2n+1)C_{calib}$), falls at or near (within 10 MHz) the channel frequency $f_{CH}$, while the immediately lower harmonic (i.e., $(2n-1)C_{calib}$) and the immediately higher harmonic (i.e., $(2n+3) C_{calib}$)) are at least the frequency spacing apart. Note that the desired relative closeness of the closest odd harmonic of the base frequency $C_{calib}$ to the channel frequency $f_{CH}$, and the frequency separation between harmonics, may be selected by one skilled in the art from the teachings herein, based on the relation between the frequency of the reference clock $C_{ref}$ and $f_{CH}$. Further, the immediately lower harmonic and the immediately higher harmonic are also at least the frequency spacing (again, e.g., 30 MHz) away from the channel frequency $f_{CH}$. Note, however, that the base frequency $C_{calib}$ may be one or more magnitudes slower than the odd harmonic target frequency at or near the 2.45 GHz channel frequency $f_{CH}$, thereby providing the calibration tone. Accordingly, the calibration clock $C_{calib}$ is selectively amplified by the amplifier 1106, providing an amplified version of the calibration clock $C_{calib}$ (i.e., the calibration tone) to the node 1018 (and its complement to the node 1020). And, the initially amplified output at the node 1018 and 1020 is further amplified using the PPA 1022 as single-ended for calibration purposes, providing the calibration tone at the node 1028 to the auxiliary receiver, favorably through capacitive coupling as discussed above with respect to the step 2004.

Given the steps 2004 and 2006, the output of the PPA 1022, at the node 1028, is coupled, through respective capacitive paths, to an input of the I data auxiliary receiver mixer 1125 and to an input of the Q data auxiliary receiver mixer 1117. Each of those mixers 1125 and 1117 is operated with clocks $I_{LO}$ and $Q_{LO}$ respectively, and each mixer 1125 and 1117 outputs through the second stage 1094S2 and 1096S2 of a respective low pass filter 1094 and 1096, and an ADC 1098 and 1100, so as to provide the digital outputs $DI_{RX}$ and $DQ_{RX}$. For an ideal circuit, if components and connectivity are evenly-matched in the applicable I and Q portions of the receive path 1004, and because the input to the mixers 1125 and 1117 are from the same node 1028 (albeit through different capacitive paths), then the digital values of $DI_{RX}$ and $DQ_{RX}$ would match. Due to actual non-idealities in the above, however, there is likely an auxiliary receiver I/Q path difference, $\Delta_{IQ}$, between the digital values of $DI_{RX}$ and $DQ_{RX}$. This difference $\Delta_{IQ}$, therefore, provides a digital value of an offset between the applicable I and Q portions of the receive path 1004. Accordingly, in step 2008, the difference $\Delta_{IQ}$ is captured, for example by storing it in a digital storage device (e.g., register, memory, or the like) accessible by and/or within the transceiver 1000. Next, the method 2000 continues from step 2008 to step 2010.

Step 2010 transitions to a different operational mode for the transceiver 1000. For example, in one example embodiment, a next mode is to provide additional calibration, in the form of digital pre-distortion (DPD), in connection with the transmit path 1002, as described below in connection with a method 3000. Alternatively, the transceiver 1000 may transition to a transmit mode. In either instance, the auxiliary receiver I/Q path difference, $\Delta_{IQ}$, may be used to calibrate the transceiver 1000, to thereby adjust for, and offset, the non-linear effects of portions of the I and Q paths in the receive path 1004.

Figure 3:
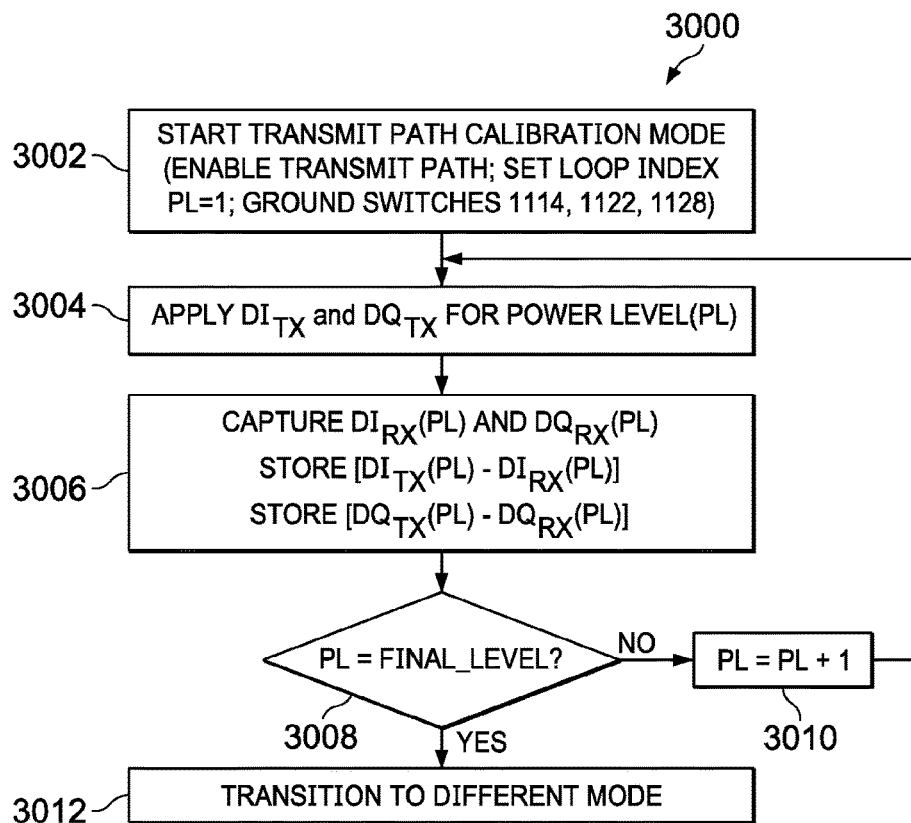
FIG. 3 illustrates a flow chart method for describing certain operations of the FIG. 1A/1B transceiver in the transmit path calibration mode.

FIG. 3 illustrates a flow chart method 3000, for describing certain operations of the transceiver 1000 in the transmit path calibration mode. This additional calibration may be a DPD calibration that may take various different forms (e.g., amplitude-to-amplitude (AM to AM), amplitude-to-phase (AM to PM), packet-based). Accordingly, one such form is described herein merely as an example. As with the flow chart 2000 of FIG. 2, the steps of FIG. 3 also are sequential for sake of explanation, but certain steps/operations may overlap, differ in order, or otherwise be accomplished within the inventive scope. The method 3000 commences with a start transmit path calibration mode step 3002. During the step 3002, all components in the transmit path 1002 are enabled (and divide block 1102, multiplier block 1104, and differential amplifier 1106 are disabled). Additionally, by way of example an AM to AM method is described, which is iterative, and for such operations a loop counter index PL is initialized to a value of one. Still further, the switches 1114, 1122, and 1128, which are open for auxiliary calibration in the method 2000 (see step 2004), are closed in the method 3000, so that the capacitive coupling from the node 1054 to the nodes 1028 and 1030 is removed. Further, variable capacitors 1132 and 1138 are adjusted to a capacitance (e.g., 390 fF) such that a reasonably strong scaled down version of the signal on the node 1054 is coupled through the respective capacitor 1130 to the I data auxiliary receiver mixer 1125 and through the respective capacitor 1136 to the Q data auxiliary receiver mixer 1117. Lastly, the receiver path till (and including) the first stage filters 1094S1 and 1096S1 are disabled. Next, the method 3000 continues from the step 3002 to a step 3004.

The step 3004 applies, to the transmit path 1002, digital values of $DI_{TX}$ and $DQ_{TX}$ corresponding to a power level for the current loop index PL. Thus, in a first iteration of the step 3004, such levels may be referred to as $DI_{TX}(PL)=DI_{TX}(1)$ and $DQ_{TX}(PL)=DQ_{TX}(1)$. These signals propagate through the devices and connections of the transmit path 1002 and reach the node 1054, from where they are capacitively coupled to a portion of the receive path 1004. Next, the method 3000 continues from the step 3004 to a step 3006.

The step 3006 captures, from the outputs of the receive path 1004, the resulting digital values of $DI_{RX}$ and $DQ_{RX}$ corresponding to a power level for the current loop index PL. Thus, in a first iteration of the step 3006, such levels may be referred to as $DI_{RX}(PL)=DI_{RX}(1)$ and $DQ_{RX}(PL)=DQ_{RX}(1)$. Note that in an ideal device, the digital values from the receive path 1004 should match the digital values input into the transmit path 1002 (i.e., $DI_{TX}(1)=DI_{RX}(1)$, and $DQ_{TX}(1)=DQ_{RX}(1)$). Due to non-idealities in the transmit path 1002 (including non-linearity of the PA 1040), as well as along the signal path traveled in portions of the calibration path 1006 and the receive path 1004, differences may occur between the transmit and receive values (i.e., $DI_{TX}(1)-DI_{RX}(1)$; $DQ_{TX}(1)-DQ_{RX}(1)$). These differences represent such non-idealities, and are stored by step 3006 for use as a DPD offset to the baseband data later communicated at the same power level PL. Next, the method 3000 continues from the step 3006 to a step 3008.

Step 3008 is a loop completed query, shown as a check to evaluate whether the loop index PL has reached a final level ("FINAL_LEVEL") representing a maximum desired number of power level iterations. If the final level is not reached, then step 3010 increments the loop index PL and the above steps 3004 and 3006 repeat for a next higher power level. Once all power levels of interest are so looped, then step 3008 is checked in the affirmative, at which point method 3000 continues from step 3008 to step 3012.

Once step 3012 is reached, all differential values from the repeated loop index instances of step 3006 will be stored, thereby collectively providing a look-up table or the like from which DPD offsets are available to effectively adjust for non-linear gain or other non-idealities in the transmit path 1002. In addition, recall that method 2000 also provides and stores the auxiliary receiver I/Q path difference, $\Delta_{IQ}$, representing an offset attributable to mismatches or the like in portions of the I and Q paths of the receive path 1004, to the extent that the path is used for auxiliary calibration. Thus, the DPD offsets of method 3000 may be further modified with the auxiliary receiver I/Q path difference, $\Delta_{IQ}$, so that the combined offsets better account for all non-linearities involved in determining the adjustment to transmitted values. Thus, step 3012 transitions to a different operational mode for the transceiver 1000. For example, in one example embodiment, a next mode is to transmit data from the transceiver 1000, using both the auxiliary receiver I/Q path difference, $\Delta_{IQ}$, from method 2000 and the DPD offsets from the method 3000, and while disabling the calibration path 1006.

The transmit mode of operation should be readily understood by one skilled in the art, further in view of the preceding teachings. During the transmit mode, all of the switches in the transceiver 1000 calibration path 1006 (i.e., 1114, 1122, 1128,) are closed, isolating the transmit path from the auxiliary receiver path. Further, variable capacitors 1132 and 1138 are kept unchanged from the previous step 2004 (and, for example, a typical value of capacitors 1132/1138 for that step is 390 fF). Still further, the auxiliary receiver mixers 1125 and 1117 are disabled and switches 1125SO and 1117SO are opened in the transmit mode. Thereafter, baseband digital data $DI_{TX}$ and $DQ_{TX}$, is input into the transmit path 1002 and is real-time offset, such as by adding or subtracting appropriate digital values, based on values determined from the prior auxiliary calibration steps (e.g., methods 2000 and 3000). Accordingly, the transmit path 1002 processes the data as it and its variant propagate along the path which ultimately transmits an analog signal, from the transmit antenna/resistive load 1060, representing a more linearized gain output signal, responsive to the adjusted baseband digital data $DI_{TX}$ and $DQ_{TX}$ values.

From the above, the example embodiments include an improved transceiver that, by virtue of the transmission format or modulation (e.g., QAM), includes plural paths in a receiver that process data by propagating signals along each such path and where a portion of those plural paths is used for obtaining one or more calibration measures for the transmit path. For example, in FIGS. 1A and 1B, the transceiver 1000 includes, in its receive path 1004, an I data path and a Q data path, both of which are used in a receiver path auxiliary function for calibrating signals to pass in the transmit path 1002. Such embodiments provide numerous benefits. For example, relatively minimal additional circuitry is provided for injecting a calibration tone into the transmit path 1002, where in the transceiver 1000 such circuitry includes the divide block 1102, the multiplier block 1104, and the amplifier 1106. As another example, these circuitries combine to provide a calibration tone, including a harmonic thereof, at or near the transceiver channel frequency, which creates a response through: (i) the already-existing LC tank input to the PPA 1022 (i.e., the capacitor 1024 and the inductor 1026); (ii) the PPA 1022; (iii) the already-existing LC tank output to the by the PPA 1022 (i.e., the capacitor 1032 and the inductor 1034); (iv) the capacitive coupling to a portion of the auxiliary receive path devices; and (v) the actual auxiliary receive path devices. The additional hardware, therefore, is negligibly small as compared to the transmit chain passives, and it is made more effective by using a portion of existing components in the transmit path to advance the calibration tone. Further, the amplitude of the calibrating tone can be adjusted such that it is strong enough for accurate I-Q mismatch calibration. Still further, by providing complete isolation between the PPA 1022 and the auxiliary portion of the receive path 1004 during the data transmit mode, the example embodiment ensures that stability and linearity of the transmit path 1002 is not compromised. In view of the above, therefore, the inventive scope is far reaching, and while various alternatives have been provided according to the disclosed embodiments, still others are contemplated and yet others can be ascertained by one skilled in the art. For example, while an example embodiment has been shown for I/Q data and with two data paths in the auxiliary receiver, other data types or number of data paths are contemplated. As another example, other forms of DPD are contemplated, although notable is that packet-based DPD on the transmit path is at least one preferred embodiment approach, as it saves battery power but also necessitates the presence of a more ideal auxiliary response, where the latter is achievable by one skilled in the art using the teachings in this document. Given the preceding, one skilled in the art should further appreciate that while some embodiments have been described in detail, various substitutions, modifications or alterations can be made to the descriptions set forth above without departing from the inventive scope, as is defined by the following claims.

What is claimed is:

1. A wireless transceiver, comprising:
  transmitter circuitry comprising an amplifier having a first input, a second input, and an output;
  receiver circuitry comprising:
    a first low-pass filter having an input and having an output, and a first analog-to-digital converter having an input coupled to the output of the first low-pass filter; and
    a second low-pass filter having an input and having an output, and a second analog-to-digital converter having an input coupled to the output of the second low-pass filter;
  calibration circuitry having a reference clock input, having a first calibration signal output coupled to the first input of the amplifier, and having a second calibration signal output coupled to the second input of the amplifier, the calibration circuitry comprising:
    a first mixer having an input and an output, the output of the first mixer coupled to the input of the first low-pass filter, and at least a first capacitor coupled between the output of the amplifier and the input of the first mixer; and
    a second mixer having an input and an output, the output of the second mixer coupled to the input of the second low-pass filter, and at least a second capacitor coupled between the output of the amplifier and the input of the second mixer.

2. The wireless transceiver of claim 1, in which the calibration circuitry comprises a second amplifier having the first calibration signal output and the second calibration signal output.

3. The wireless transceiver of claim 2, in which the second amplifier has a first input and a second input, and the second amplifier is configured to:
  receive a signal responsive to a reference clock at the first input of the second amplifier; and
  receive a signal responsive to a complement of the reference clock at the second input of the second amplifier.

4. The wireless transceiver of claim 1, in which the calibration circuitry comprises a multiplier and a divider coupled to the reference clock input and to the first and second calibration signal outputs.

5. The wireless transceiver of claim 1, in which the calibration circuitry comprises:
a multiplier having an input and an output;
a divider having the reference clock input and having an output coupled to the input of the multiplier;
an inverter having an input coupled to the output of the multiplier, and having an output; and
a second amplifier having the first and second calibration signal outputs, having a first input coupled to the output of the multiplier, and having a second input coupled to the output of the inverter.

6. The wireless transceiver of claim 1, in which the amplifier has a second output, and the calibration circuitry comprises:
a third capacitor having a first terminal and a second terminal, the first terminal of the third capacitor coupled to the second output of the amplifier; and
a switch having a first terminal coupled to the second terminal of the third capacitor, and having a second terminal coupled to a ground terminal.

7. The wireless transceiver of claim 1, in which the calibration circuitry is configured to provide a calibration tone at the first calibration signal output, in which the calibration tone is based on a reference clock at the reference clock input, and the calibration tone has an odd harmonic at or within a frequency spacing of a channel frequency of the wireless transceiver.

8. The wireless transceiver of claim 1:
in which the first capacitor has a first terminal coupled to the output of the amplifier, and has a second terminal, and the calibration circuitry comprises a first switch coupled between the second terminal of the first capacitor and a ground terminal; and
in which the second capacitor has a first terminal coupled to the output of the amplifier, and has a second terminal, and the calibration circuitry comprises a second switch coupled between the second terminal of the second capacitor and the ground terminal.

9. The wireless transceiver of claim 1, in which the calibration circuitry comprises:
a first switch coupled between the output of the first mixer and the input of the first low-pass filter; and
a second switch coupled between the output of the second mixer and the input of the second low-pass filter.

10. The wireless transceiver of claim 1, in which the transmitter circuitry comprises:
a variable capacitor coupled between the first and second inputs of the amplifier; and
an inductor coupled between the first and second inputs of the amplifier.

11. The wireless transceiver of claim 10, in which the amplifier has a second output, and the transmitter circuitry comprises:
a second variable capacitor coupled between the first and second outputs of the amplifier; and
a second inductor coupled between the first and second outputs of the amplifier.

12. The wireless transceiver of claim 11, in which the transmitter circuitry comprises a transformer, and the second inductor is a primary winding of the transformer.

13. The wireless transceiver of claim 1, in which:
the first mixer is an in-phase (I) mixer; and
the second mixer is a quadrature (Q) mixer.

14. A wireless transceiver, comprising:
transmitter circuitry having an output adapted to couple to an antenna;
receiver circuitry comprising:
a first low-pass filter having an input and having an output, and a first analog-to-digital converter having an input coupled to the output of the first low-pass filter; and
a second low-pass filter having an input and having an output, and a second analog-to-digital converter having an input coupled to the output of the second low-pass filter;
calibration circuitry comprising:
a first mixer having an input and an output, the output of the first mixer coupled to the input of the first low-pass filter, and at least a first capacitor coupled between the output of the transmitter circuitry and the input of the first mixer;
a second mixer having an input and an output, the output of the second mixer coupled to the input of the second low-pass filter, and at least a second capacitor coupled between the output of the transmitter circuitry and the input of the second mixer;
a first switch coupled between the output of the first mixer and the input of the first low-pass filter; and
a second switch coupled between the output of the second mixer and the input of the second low-pass filter.

15. A wireless transceiver, comprising:
transmitter circuitry having an output adapted to couple to an antenna;
receiver circuitry comprising:
a first low-pass filter having an input and having an output, and a first analog-to-digital converter having an input coupled to the output of the first low-pass filter; and
a second low-pass filter having an input and having an output, and a second analog-to-digital converter having an input coupled to the output of the second low-pass filter;
calibration circuitry comprising:
a first mixer having an input and an output, the output of the first mixer coupled to the input of the first low-pass filter, and at least a first capacitor coupled between the output of the transmitter circuitry and the input of the first mixer; and
a second mixer having an input and an output, the output of the second mixer coupled to the input of the second low-pass filter, and at least a second capacitor coupled between the output of the transmitter circuitry and the input of the second mixer;
in which the first capacitor has a first terminal coupled to the output of the transmitter circuitry, and has a second terminal, and the calibration circuitry comprises a first switch coupled between the second terminal of the first capacitor and a ground terminal; and
in which the second capacitor has a first terminal coupled to the output of the transmitter circuitry, and has a second terminal, and the calibration circuitry comprises a second switch coupled between the second terminal of the second capacitor and the ground terminal.

16. The wireless transceiver of claim 15:
in which the first capacitor has a first terminal coupled to the output of the transmitter circuitry, and has a second terminal, and the calibration circuitry comprises a first variable capacitor coupled between the second terminal of the first capacitor and a ground terminal; and in which the second capacitor has a first terminal coupled to the output of the transmitter circuitry, and has a second terminal, and the calibration circuitry comprises a second variable capacitor coupled between the second terminal of the second capacitor and the ground terminal.

17. The wireless transceiver of claim 15, in which the calibration circuitry comprises:
a third switch coupled between the output of the first mixer and the input of the first low-pass filter; and
a fourth switch coupled between the output of the second mixer and the input of the second low-pass filter.

18. A wireless transceiver, comprising:
transmitter circuitry comprising an amplifier having a first input, a second input, and an output, the transmitter circuitry having an output adapted to couple to an antenna;
receiver circuitry comprising:
a first low-pass filter having an input and having an output, and a first analog-to-digital converter having an input coupled to the output of the first low-pass filter; and
a second low-pass filter having an input and having an output, and a second analog-to-digital converter having an input coupled to the output of the second low-pass filter;
calibration circuitry having a reference clock input, having a first calibration signal output coupled to the first input of the amplifier, and having a second calibration signal output coupled to the second input of the amplifier, the calibration circuitry comprising:
a first mixer having an input and an output, the output of the first mixer coupled to the input of the first low-pass filter, at least a first capacitor coupled between the output of the amplifier and the input of the first mixer, and at least a second capacitor coupled between the output of the transmitter circuitry and the input of the first mixer; and
a second mixer having an input and an output, the output of the second mixer coupled to the input of the second low-pass filter, at least a third capacitor coupled between the output of the amplifier and the input of the second mixer, and at least a fourth capacitor coupled between the output of the transmitter circuitry and the input of the second mixer.

19. The wireless transceiver of claim 18, in which the amplifier has a second output, and the calibration circuitry comprises:
a fifth capacitor having a first terminal and a second terminal, the first terminal of the fifth capacitor coupled to the second output of the amplifier; and
a switch having a first terminal coupled to the second terminal of the fifth capacitor, and having a second terminal coupled to a ground terminal.

20. The wireless transceiver of claim 18, in which:
the first capacitor has a first terminal coupled to the output of the amplifier, and has a second terminal, and the calibration circuitry comprises a first switch coupled between the second terminal of the first capacitor and a ground terminal;
the third capacitor has a first terminal coupled to the output of the amplifier, and has a second terminal, and the calibration circuitry comprises a second switch coupled between the second terminal of the third capacitor and the ground terminal;
the second capacitor has a first terminal coupled to the output of the transmitter circuitry, and has a second terminal, and the calibration circuitry comprises a first variable capacitor coupled between the second terminal of the second capacitor and the ground terminal; and
the fourth capacitor has a first terminal coupled to the output of the transmitter circuitry, and has a second terminal, and the calibration circuitry comprises a second variable capacitor coupled between the second terminal of the fourth capacitor and the ground terminal.

* * * * *